(12) United States Patent
Gaudlip

(10) Patent No.: US 9,998,395 B1
(45) Date of Patent: Jun. 12, 2018

(54) WORKLOAD CAPSULE GENERATION AND PROCESSING

(71) Applicant: EMC Corporation, Hopkinton, MA (US)

(72) Inventor: Christopher Gaudlip, Plano, TX (US)

(73) Assignee: EMC IP Holding Company LLC, Hopkinton, MA (US)

(*) Notice: Subject to any disclaimer, the term of this patent is extended or adjusted under 35 U.S.C. 154(b) by 314 days.

(21) Appl. No.: 14/870,899

(22) Filed: Sep. 30, 2015

(51) Int. Cl.
*H04L 12/911* (2013.01)
*G06F 9/48* (2006.01)

(52) U.S. Cl.
CPC .......... *H04L 47/783* (2013.01); *G06F 9/4881* (2013.01); *H04L 47/822* (2013.01)

(58) Field of Classification Search
CPC ..... H04L 63/10; H04L 43/08; H04L 41/0681; H04L 41/08; H04L 43/06; H04L 67/1008; H04L 67/34; H04L 47/783; H04L 47/62; H04L 47/828; H04L 47/25; H04L 47/822; H04L 47/823; H04L 47/827; H04L 47/788; G06F 9/4881
See application file for complete search history.

(56) References Cited

U.S. PATENT DOCUMENTS

| 2006/0195846 A1* | 8/2006 | Benedetti | G06F 9/5027 718/102 |
| 2006/0230149 A1* | 10/2006 | Jackson | G06F 9/5027 709/226 |
| 2007/0088703 A1 | 4/2007 | Kasiolas et al. | |
| 2008/0010642 A1* | 1/2008 | MacLellan | G06F 9/5038 718/102 |
| 2009/0125432 A1 | 5/2009 | Deshpande et al. | |
| 2011/0016214 A1 | 1/2011 | Jackson | |
| 2012/0005482 A1* | 1/2012 | Falk | H04L 63/0823 713/176 |
| 2012/0179824 A1* | 7/2012 | Jackson | G06F 9/5027 709/226 |
| 2012/0284410 A1 | 11/2012 | Dudek et al. | |
| 2012/0303736 A1* | 11/2012 | Novotny | H04L 67/1097 709/213 |

(Continued)

*Primary Examiner* — Patrice L Winder
*Assistant Examiner* — Aye M Aung
(74) *Attorney, Agent, or Firm* — Ryan, Mason & Lewis, LLP

(57) ABSTRACT

An apparatus comprises at least one processing platform having one or more processing devices. The processing platform is configured to generate a plurality of workload capsules for transmission to a broker device over a network. A given one of the workload capsules comprises a self-contained and independent workload to be performed by another processing platform as determined by the broker device in accordance with one or more attributes specified in the workload capsule and one or more criteria specified in the workload capsule. The given workload capsule further comprises a process description identifying at least one of server resources, storage resources, network resources and physical security resources to be utilized by the other processing platform in performing the workload. The broker device may be part of a central compute depository platform that receives workload capsules from multiple source devices over the network.

20 Claims, 7 Drawing Sheets

(56) References Cited

U.S. PATENT DOCUMENTS

| | | | | |
|---|---|---|---|---|
| 2014/0095691 A1* | 4/2014 | Ganguli | ............. | H04L 41/5025 |
| | | | | 709/224 |
| 2015/0067171 A1* | 3/2015 | Yum | .................... | G06F 9/5072 |
| | | | | 709/226 |
| 2016/0065492 A1* | 3/2016 | Hu | ....................... | H04L 47/783 |
| | | | | 709/226 |
| 2016/0065618 A1* | 3/2016 | Banerjee | ................ | H04L 63/20 |
| | | | | 726/1 |
| 2016/0198003 A1* | 7/2016 | Luft | ....................... | H04L 12/46 |
| | | | | 709/225 |
| 2016/0205202 A1* | 7/2016 | Jia | ....................... | H04L 47/783 |
| | | | | 705/40 |
| 2017/0199770 A1* | 7/2017 | Peteva | ................. | G06F 9/5088 |

* cited by examiner

| | MICRO | SMALL | MEDIUM | LARGE | X-LARGE |
|---|---|---|---|---|---|
| ENCAPSULATED SIZE | | | | | |
| PHYSICAL SECURITY | $ | $$ | $$$ | $$$$ | $$$$ |
| NETWORK ATTRIBUTE #3 | ENCRYPTION Y/N | ENCRYPTION Y/N | ENCRYPTION Y/N | ENCRYPTION Y/N | ENCRYPTION Y/N |
| NETWORK ATTRIBUTE #2 | FIFO | FIFO | PRIORITIZED | QOS | DEDICATED |
| NETWORK ATTRIBUTE #1 | BANDWIDTH L/M/H | BANDWIDTH L/M/H | BANDWIDTH L/M/H | BANDWIDTH L/M/H | BANDWIDTH L/M/H |
| SERVER ATTRIBUTE #3 | RAM SPEED L/M/H | RAM SPEED L/M/H | RAM SPEED L/M/H | RAM SPEED L/M/H | RAM SPEED L/M/H |
| SERVER ATTRIBUTE #2 | RAM S/M/L | RAM S/M/L | RAM S/M/L | RAM S/M/L | RAM S/M/L |
| SERVER ATTRIBUTE #1 | CPU L/M/H | CPU L/M/H | CPU L/M/H | CPU L/M/H | CPU L/M/H |
| STORAGE ATTRIBUTE #3 | RPO L/M/H | RPO L/M/H | RPO L/M/H | RPO L/M/H | RPO L/M/H |
| STORAGE ATTRIBUTE #2 | IO DENSITY L/M/H | IO DENSITY L/M/H | IO DENSITY L/M/H | IO DENSITY L/M/H | IO DENSITY L/M/H |
| STORAGE ATTRIBUTE #1 | BULK IO Y/N | BULK IO Y/N | BULK IO Y/N | BULK IO Y/N | BULK IO Y/N |

| ENCAPSULATED COMPLEXITY | BRONZE | SILVER | GOLD | PLATINUM | DIAMOND |
|---|---|---|---|---|---|
| SLA | $ | $$ | $$$ | $$$$ | $$$$ |
| APPLICATION #3 | MICROSOFT | MICROSOFT | MICROSOFT | MICROSOFT | MICROSOFT |
| APPLICATION #2 | SAP | SAP | SAP | SAP | SAP |
| APPLICATION #1 | ORACLE | ORACLE | ORACLE | ORACLE | ORACLE |
| MIDDLEWARE #3 | PROPRIETARY SCRIPTS | PROPRIETARY SCRIPTS | PROPRIETARY SCRIPTS | PROPRIETARY SCRIPTS | PROPRIETARY SCRIPTS |
| MIDDLEWARE #2 | OPEN SOURCE | OPEN SOURCE | OPEN SOURCE | OPEN SOURCE | OPEN SOURCE |
| MIDDLEWARE #1 | THIRD PARTY SOFTWARE | THIRD PARTY SOFTWARE | THIRD PARTY SOFTWARE | THIRD PARTY SOFTWARE | THIRD PARTY SOFTWARE |
| DATA TYPE #3 | PROPRIETARY | PROPRIETARY | PROPRIETARY | PROPRIETARY | PROPRIETARY |
| DATA TYPE #2 | BLOCK/FILE/ OBJECT | BLOCK/FILE/ OBJECT | BLOCK/FILE/ OBJECT | BLOCK/FILE/ OBJECT | BLOCK/FILE/ OBJECT |
| DATA TYPE #1 | IMBEDDED OR EXTERNAL | IMBEDDED OR EXTERNAL | IMBEDDED OR EXTERNAL | IMBEDDED OR EXTERNAL | IMBEDDED OR EXTERNAL |

WORKLOAD CAPSULE GENERATION AND PROCESSING

FIELD

The field relates generally to information processing systems, and more particularly to workload processing in such systems.

BACKGROUND

Information processing systems increasingly utilize reconfigurable virtual resources to meet changing user needs. For example, cloud computing and storage systems implemented using virtual machines have been widely adopted. Such cloud-based systems include, for example, Amazon Web Services (AWS), Google Cloud Platform (GCP), and Microsoft Azure. Nonetheless, many such cloud-based systems include unused capacity at various times. This is true not only for public and private clouds, but also a wide variety of other types of information processing systems, including systems that do not necessarily utilize virtualization infrastructure. For example, private companies, universities or other enterprises may have considerable amounts of spare capacity available at nights or on weekends in their enterprise information processing systems. In many cases, such spare capacity remains unused. This is due at least in part to the failure of conventional practice to provide an adequate mechanism for encouraging utilization of such spare capacity.

SUMMARY

Illustrative embodiments of the present invention provide information processing systems in which workloads associated with one processing platform can each be encapsulated into one or more workload capsules that are distributed by a broker device to other processing platforms. The workload capsules are processed by the other processing platforms and the results are delivered back to the requesting processing platform via the broker device or delivered to a designated destination device. Such an arrangement facilitates completion of the corresponding workloads in a particularly efficient, flexible and cost-effective manner through utilization of unused capacity on the other processing platforms.

In one embodiment, an apparatus comprises at least one processing platform having one or more processing devices. The processing platform is configured to generate a plurality of workload capsules for transmission to a broker device over a network. A given one of the workload capsules comprises a self-contained and independent workload to be performed by another processing platform as determined by the broker device in accordance with one or more attributes specified in the workload capsule and one or more criteria specified in the workload capsule. The given workload capsule further comprises a process description identifying at least one of server resources, storage resources, network resources and physical security resources to be utilized by the other processing platform in performing the workload.

The broker device may be part of a central compute depository platform in some embodiments that receives workload capsules from source devices over the network, delivers the workload capsules to other processing platforms over the network for processing of the corresponding workloads, and returns results of the processing of the workloads to destination devices over the network.

The processing platform that generates the given workload capsule in some embodiments runs an application program providing a user interface that presents information characterizing multiple other processing platforms that are available to perform the corresponding workload and allows a user to select one of the multiple other processing platforms to perform the corresponding workload.

Illustrative embodiments described herein provide significant improvements relative to conventional arrangements. For example, one or more such embodiments can allow a given processing platform to offload at least portions of its workloads while also improving the resource utilization of other processing platforms. Such an arrangement can be a highly advantageous approach for users of requesting processing platforms that generate the workload capsules while also providing a significant revenue stream to the other processing platforms that execute the workload capsules.

These and other illustrative embodiments include, without limitation, methods, apparatus, systems, and processor-readable storage media.

BRIEF DESCRIPTION OF THE DRAWINGS

FIGS. 8 and 9 show examples of respective physical and logical encapsulation features for use in generating workload capsules in illustrative embodiments.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
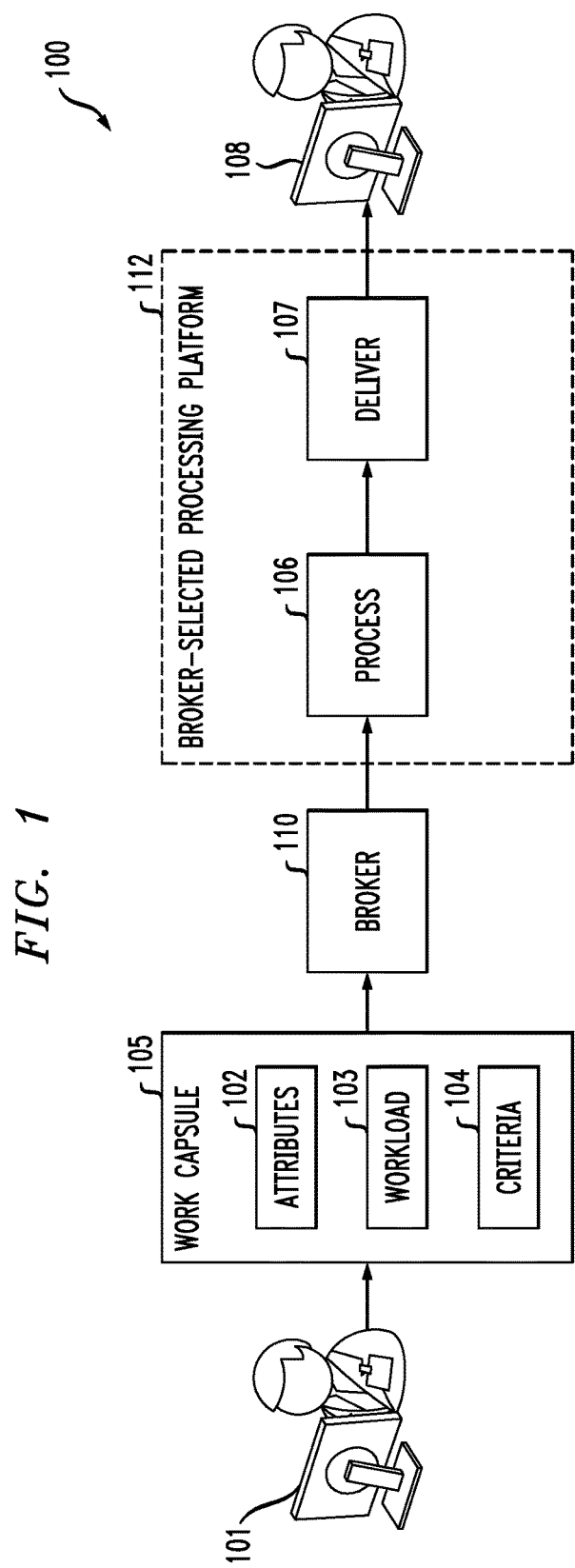
FIGS. 1 through 7 are block diagrams illustrating an information processing system that incorporates functionality for work capsule generation and broker-directed workload capsule processing in an illustrative embodiment of the invention.

FIG. 1 shows an information processing system 100 configured in accordance with an illustrative embodiment of the present invention. The information processing system 100 comprises at least one processing platform that includes at least a source processing device 101. A user at the source processing device 101 specifies one or more attributes 102 for a workload 103. The user also specifies one or more encapsulation criteria 104 for the workload 103. The attributes 102 and criteria 104 are utilized to generate a workload capsule 105 for the workload 103. The workload capsule 105 is also referred to herein as a "work capsule" in the context of certain figures.

The workload capsule 105 comprises a self-contained and independent workload 103 to be performed utilizing a process 106 and a delivery module 107 associated with another processing platform as determined by a broker device 110 in accordance with one or more of the attributes 102 specified in the workload capsule 105 and one or more of the criteria 104 specified in the workload capsule 105. The other processing platform in this embodiment more particularly comprises broker-selected processing platform 112. For example, the broker device 110 can select a particular processing platform to execute the workload capsule 105 based on bids submitted from multiple such platforms. In other embodiments, a user associated with the source device 101 may be involved in the selection of processing platform 112. An arrangement of the latter type can still involve the broker device 110 in the determination of the processing platform 112 that executes the workload capsule 105.

Accordingly, the "determination" of a processing platform to perform a workload of a workload capsule as that term is broadly used herein should be understood to encompass arrangements in which the broker device 110 does not necessarily select the processing platform but instead assists the user in making such a selection of processing platform, for example, by providing the user with information characterizing one or more processing platforms capable of executing the workload capsule.

The workload capsule 105 further comprises a process description identifying at least one of server resources, storage resources, network resources and physical security resources to be utilized by the process 106 implemented in the processing platform 112 in conjunction with performing the workload 103. This arrangement will be described in more detail in conjunction with FIG. 5.

It is assumed that communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks. Such networks are not explicitly shown in the illustrative embodiment of FIG. 1.

The term "network" as used herein is intended to be broadly construed. References herein to a "network" are therefore intended to encompass any arrangement of one or more networks or portions of such networks. Accordingly, processing device 101 communicates over a network with broker device 110 and broker device 110 communicates over a network with processing platform 112. Similarly, processing platform 112 communicates over a network with destination device 108. These networks may be the same network or different portions of a network made up of multiple networks of different types.

As indicated above, the processing platform 112 determined by broker device 110 implements process 106 for executing the workload 103 encapsulated by the workload capsule 105, and also incorporates delivery module 107 for delivering a completed version of the workload capsule comprising workload processing results back to the broker device 110 or to another destination device. For example, the processing platform 112 in the FIG. 1 embodiment delivers the completed version of the workload capsule to a destination device 108.

The destination device 108 may in some implementations of system 100 be the same device as the source device 101. In such an arrangement, the workload capsule 105 is generated for the source device 101 and specifies that results are to be returned to that source device over the network. Alternatively, the destination device 108 may be a device other than the source device 101. In an arrangement of this type, the workload capsule 105 is generated for the source device 101 and specifies that results are to be returned to a particular destination device different than the source device.

It is also possible that the completed version of the workload capsule is returned by the processing platform 112 to the broker device, which returns it to the source device 101 or to a different destination device 108. Numerous alternative delivery options are possible for completed versions of workload capsules or associated processing results in other embodiments of the invention.

The source device 101 is an example of what is more generally referred to herein as a "processing device." Such a device is assumed to be part of a processing platform, examples of which will be described in more detail below in conjunction with FIGS. 11 and 12. The processing platform that includes source device 101 is further assumed to generate multiple workload capsules similar to the workload capsule 105 for different processing jobs. The multiple workload capsules are transmitted by the processing platform that includes source device 101 to the broker device 110 over the network. The processing platform that includes the source device 101 is assumed to be separate and distinct from the processing platform 112 that is selected by the broker device 110 for execution of the workload capsule 105.

A given such processing platform comprises at least one processing device comprising a processor coupled to a memory, and the processing device may be implemented at least in part utilizing one or more virtual machines or other types of virtualization infrastructure such as Docker containers or other types of Linux containers (LXCs). A workload capsule as disclosed herein may therefore comprise information characterizing an LXC or other container-based processing arrangement.

The destination device 108 is another example of a processing device as that term is broadly used herein. As illustrated in the figure, the source and destination devices 101 and 108 comprise respective computers associated with system users. However, it is to be appreciated that the source and destination devices could instead comprise mobile telephones, laptop computers, tablet computers or other types of processing devices.

The "users" in this embodiment may refer, for example, to human users associated with respective ones of the source and destination devices 101 and 108, although the term "user" as utilized herein is intended to be broadly construed so as to encompass numerous other arrangements of human, hardware, software or firmware entities, as well as combinations of such entities.

The source and destination devices 101 and 108 can communicate with the broker device 110 via one or more application programming interfaces (APIs) or other types of communication interfaces.

As mentioned previously, the broker device 110 can select a particular processing platform to execute the workload capsule 105 based on bids submitted from multiple such platforms. In this embodiment, it is assumed that the broker device 110 has selected the processing platform 112 to execute the workload capsule 105.

The selection of the processing platform 112 can be based at least in part on receipt by the broker device 110 of a successful bid for processing of the workload capsule 105. Thus, for example, one of the attributes 102 of the workload capsule 105 can include a price that the processing platform will receive for executing the workload capsule 105. Such a price may be specified at least in part using a "billing" or "invoicing" portion of the attributes 102 of the workload capsule 105.

The broker device 110 can aggregate workload capsules received from multiple distinct source devices of multiple distinct processing platforms for purposes of permitting other processing platforms such as processing platform 112 to enter bids for performing the corresponding workloads. Accordingly, the multiple workload capsules can each be bid on by the processing platform 112 and one or more additional processing platforms independently of source and destination devices of those workload capsules.

In some embodiments, the workload capsule 105 specifies a partial processing job that represents a portion of a larger processing job partitioned into multiple distinct workload capsules. Such partitioning may be performed by the source device 101 or its associated processing platform, which as noted above is separate and distinct from the broker-selected processing platform 112 that executes the workload capsule 105. It is therefore possible that multiple workload capsules can be generated for a large processing job, each including as its workload a corresponding portion of that processing job.

The workload capsule 105 illustratively comprises data to be processed and metadata indicating at least a portion of the attributes 102, the criteria 104 and the process description characterizing the workload 103. It is therefore possible that at least portions of the workload capsule 105 are described in the form of metadata which indicates the particular manner in which data contained in the workload capsule 105 is to be processed by process 106 and the results delivered by module 107.

By way of example, metadata associated with one or more workload capsules in illustrative embodiments may comprises one or more of the following:

1. Billing information
2. Computing requirements such as complete before, not before or not after, etc.
3. Source and target recipients
4. Invoicing information
5. Security requirements, encryption, must stay within country, etc.
6. SLA such as must use floating point processing or checkpoint validation
7. Any legal ramifications of securing the data or tracking information
8. Licensing validation for software
9. Networking address and link data if going directly to end user versus back to the broker
10. Physical size of capsule
11. Estimated processing requirements in terms of one or more of CPU, RAM and network resources.

At least portions of such metadata may be generated at least in part from one or more of the attributes 102, workload 103 and criteria 104 associated with the workload capsule 105 in conjunction with its generation on the processing platform that includes the source device 101. The workload capsule 105 may additionally include process-related elements such as source data to be processed, operating system modules, external links such as currency translators or other external sources, and internal processing modules or subroutines. Such elements are exemplary only and may be varied in other embodiments.

The workload capsule 105 is illustratively configured in some embodiments as a fully stand-alone compute entity that can be readily transmitted to any processing platform having the requisite capabilities for its execution. It is executed by the receiving processing platform as an independent unit of work and includes all data and other information necessary to its execution on such a processing platform. The receiving processing platform such as broker-selected processing platform 112 in the FIG. 1 embodiment receives within the workload capsule 105 all information that is needed for its execution in terms of the process for performance of the corresponding workload 103. The processing platform 112 simply opens the capsule, follows the included instructions for its execution and returns the results to the specified destination device 108 or to the broker device 110.

As noted above, a user associated with the source device 101 may be involved in the selection of processing platform 112. In an example of an arrangement of this type, the processing platform that includes source device 101 and generates workload capsule 105 runs an application program. This application program provides a user interface on source device 101 that presents information characterizing multiple other processing platforms such as processing platform 112 that are available to perform the corresponding workload 103 characterized by the workload capsule 105. The application program further allows a user at the source device 101 to select via the user interface one of the multiple other processing platforms to perform the corresponding workload 103.

Accordingly, in some embodiments, the processing platform that executes the workload capsule 105 is selected by the user via the application program instead of by the broker device 110. Additionally or alternatively, the broker device 110 can provide input to the application program regarding various bids entered by different processing platforms for execution of the workload capsule 105 and the user via the user interface of the application program can select a particular one of the processing platforms based on their respective entered bids as provided by the broker device 110.

In arrangements of this type, the application program serves to advertise spare capacity of processing platforms to a user of the source device, and similar application programs on other source devices similarly advertise the spare capacity of the processing platforms to other users of those other source devices. As a result, users can see that spare capacity, and can request that their workload capsules be processed by particular ones of the processing platforms in accordance with particular specified pricing or other parameters.

Thus, it is possible in some embodiments for proposed pricing to be advertised to the users by the processing platforms rather than the processing platforms bidding against one another for the right to process workload capsules. In some of these embodiments, the users may enter their own pricing and receive corresponding proposals from one or more processing platforms via the broker device 110.

The broker device 110 in some embodiments is implemented as part of a compute bank clearing house or other type of central compute depository platform that receives workload capsules from source devices over the network, delivers the workload capsules to other processing platforms over the network for processing of the corresponding workloads, and returns results of the processing of the workloads to destination devices over the network. The broker device 110 may therefore be part of a processing platform that is separate from both the processing platform that includes the source device 101 and the processing platform 112 that executes the workload capsule.

The processing platform 112 that successfully bids on a given workload capsule or otherwise obtains the right to execute that workload capsule receives the workload capsule from the broker device 110, opens and processes the workload capsule, and then repackages the completed version of the workload capsule and delivers it to the specified destination device 108 or back to the broker device 110.

Embodiments of the invention that utilize bidding arrangements provide significant benefits to the requesting users in terms of potentially lower costs for workload capsule processing. Also, the winning bidder benefits by utilizing spare capacity in its processing platform in a manner that also produces revenue. The exposure of that processing platform is limited only to completion of the single workload capsule. Accordingly, there is no significant "lock-in" risk for the bidding processing platform.

More detailed views of the attributes 102, workload 103, criteria 104 and workload capsule 105 are shown in respective FIGS. 2, 3, 4 and 5.

Figure 2:
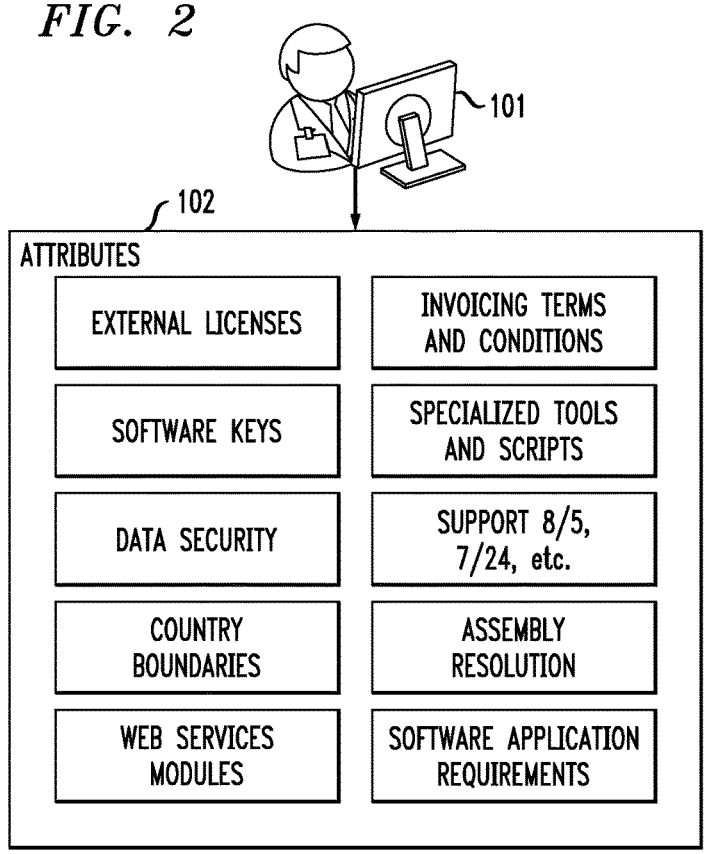

With reference initially to FIG. 2, it can be seen that the attributes 102 of the workload capsule 105 in this embodiment illustratively comprise external licenses, software keys, data security parameters, country boundaries, web services modules, invoicing terms and conditions, specialized tools and scripts, support type (e.g., 8/5, 7/24, etc.), assembly resolution, and software application requirements. It should be noted that a given workload capsule in other embodiments may utilize only a subset of these attributes, or additional or alternative attributes.

Figure 3:
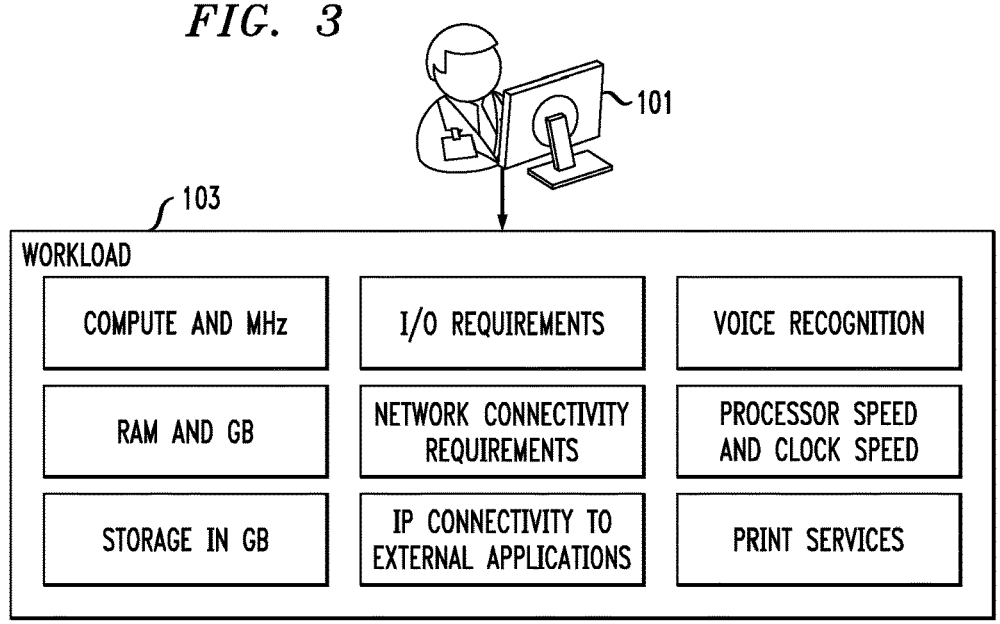

Referring now to FIG. 3, the workload 103 of the workload capsule 105 in the present embodiment comprises compute resource parameters including speed in megahertz (MHz), random access memory parameters including size in gigabytes (GB), storage parameters including size in GB, input/output (I/O) requirements, network connectivity requirements, IP connectivity to external applications, voice recognition, processor speed and clock speed, and print services. Again, a given workload capsule in other embodiments may utilize only a subset of these workload parameters, or additional or alternative workload parameters.

Figure 4:
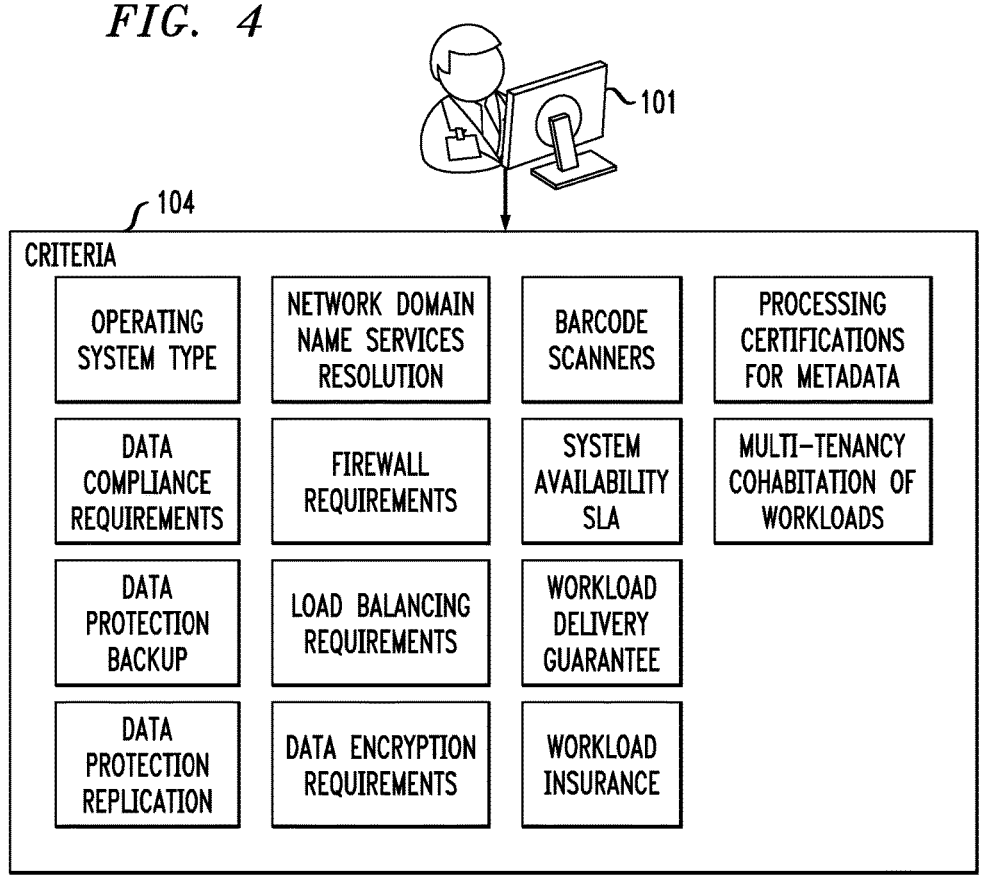

FIG. 4 shows the criteria 104 of the workload capsule 105 as illustratively comprising operating system type, data compliance requirements, data protection backup, data protection replication, network domain name services resolution, firewall requirements, load balancing requirements, data encryption requirements, barcode scanners, system availability service level agreement (SLA), workload delivery guarantee, workload insurance, processing certifications for metadata, and multi-tenancy cohabitation of workloads. As in the case of the attributes 102 and workload 103, a given workload capsule in other embodiments may utilize only a subset of these criteria, or additional or alternative criteria.

Figure 5:
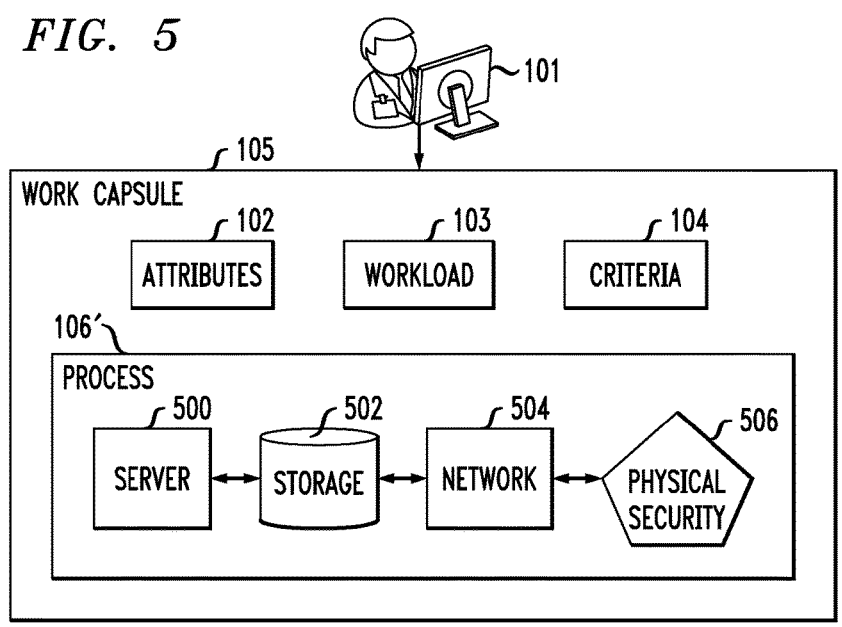

The workload capsule 105 is illustrated in more detail in FIG. 5. As illustrated, the workload capsule 105 comprises attributes 102, workload 103 and criteria 104 as previously described. The workload capsule 105 further comprises a process description 106' identifying server resources 500, storage resources 502, network resources 504 and physical security resources 506 to be utilized by the corresponding process 106 implemented in the processing platform 112 in conjunction with performing the workload 103.

The workload capsule 105 as illustrated in FIG. 5 includes all data and other information needed by the processing platform 112 to execute the workload 103, including attributes, criteria, workload parameters and a process description. Accordingly, the workload capsule 105 can be opened and executed by any processing platform that can meet its requirements. No additional information is needed from the source device 101, destination device 108 or any other system entity. Such an arrangement encourages widespread bidding for the right to execute such workload capsules by processing platforms that have spare capacity.

Figure 6:
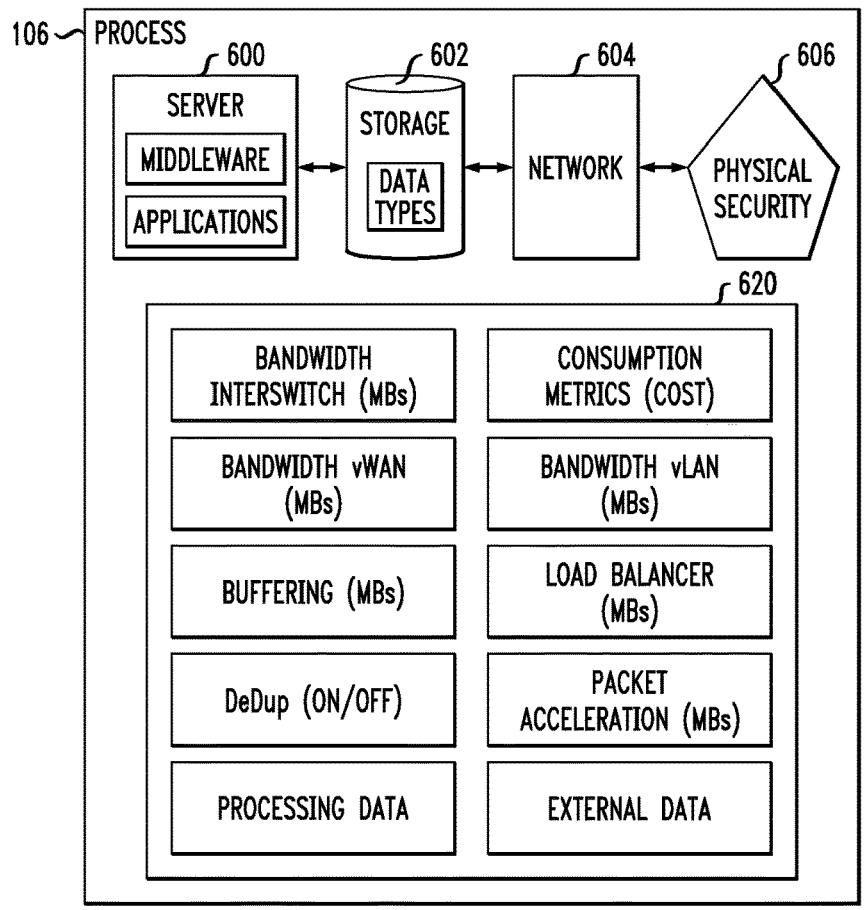

FIG. 6 illustrates the process 106 performed by the processing platform 112 in executing the workload capsule 105. The process 106 comprises a particular arrangement of designated server resources 600, storage resources 602, network resources 604 and physical security resources 606 which are configured in a manner consistent with the process description 106' of the workload capsule 105. The server resources 600 illustratively include middleware and application resources, and the storage resources 602 illustratively comprise data type resources.

The process 106 further comprises additional process parameters 620 derived at least in part from one or more of the attributes 102, workload 103 and criteria 104. These additional parameters illustratively include, in the present embodiment, bandwidth between switches ("interswitch") in megabytes (MBs), bandwidth for virtual WAN (vWAN) in MBs, buffering in MBs, deduplication ("deDup") status (On/Off), processing data, consumption metrics (e.g., cost), bandwidth for virtual LAN (vLAN) in MBs, load balancer in MBs, packet acceleration in MBs, and external data.

Figure 7:
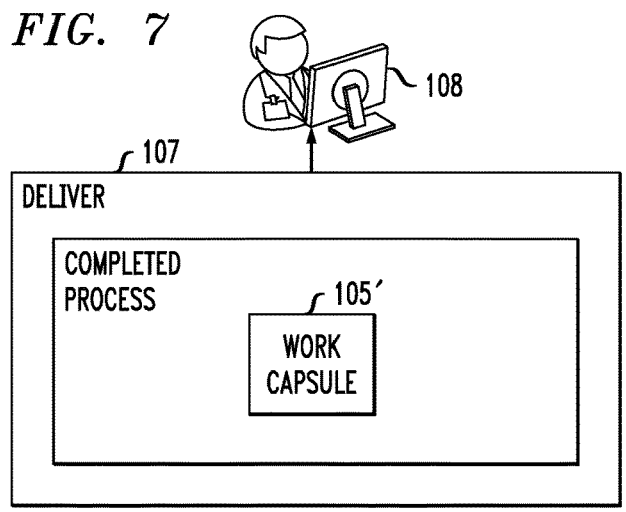

As illustrated in FIG. 7, execution of the workload capsule 105 using the process 106 in the processing platform 112 results in a completed version 105' of the workload capsule 105. This completed version is delivered by the delivery module 107 to the destination device 108. It was noted above that the destination device 108 in some implementations of system 100 is the same as the source device 101. Accordingly, the completed version 105' of the workload capsule 105 can be returned to the source device 101, possibly via the broker device 110. Alternatively, a destination device 108 that is different than the source device 101 can be specified in the workload capsule 105 itself.

Examples of respective physical and logical encapsulation features for use in generating workload capsules in system 100 are shown in respective FIGS. 8 and 9. At least a portion of the identified features are associated with one or more of the attributes 102, workload 103, criteria 104 and process 106 as previously described.

With reference first to the physical encapsulation features of FIG. 8, the workload capsules generated in accordance with these features are characterized by an encapsulated size, which can take on values of micro, small, medium, large and x-large. These size parameters are illustratively associated with respective distinct physical security levels denoted by increasing dollar signs in the figure. Also associated with the various size parameters are corresponding storage parameters, server parameters and network parameters. Such parameters can be viewed as attributes characterizing respective storage, server and network resources of the workload capsule, such as the resources 500, 502 and 504 of the process description 106' of FIG. 5. The physical security levels may correspond to respective physical security resources 506 in FIG. 5.

The storage resources in the FIG. 8 example are characterized by a plurality of storage parameters including one or more of a bulk IO parameter, an IO density parameter and a recover point objective (RPO) parameter. The bulk IO parameter is a yes-or-no (Y/N) parameter, the IO density parameter is a low-medium-high (L/M/H) parameter, as is the RPO parameter.

The server resources in the FIG. 8 example are characterized by a plurality of server parameters including one or more of a processor speed parameter ("CPU"), a memory ("RAM") size parameter and a memory speed parameter. The processor speed and memory speed parameters are L/M/H parameters, and the memory size parameter is a small-medium-large (S/M/L) parameter.

The network resources in the FIG. 8 example are characterized by a plurality of network parameters including one or more of a bandwidth parameter, a prioritization parameter and an encryption parameter. The bandwidth parameter is an L/M/H parameter, and the encryption parameter is a Y/N parameter. The prioritization parameter can take on values of first-in first-out (FIFO), prioritized, quality of service (QOS) or dedicated.

Turning now to the logical encapsulation features of FIG. 9, the workload capsules generated in accordance with these features are characterized by an encapsulated complexity, which can take on values of bronze, silver, gold, platinum and diamond, associated with respective distinct SLA levels denoted by increasing dollar signs in the figure. The logical encapsulation features further comprise data type parameters, middleware parameters and application parameters.

The data type parameters in the FIG. 9 example include imbedded or external data types, block, file or object data types, and proprietary data types.

The middleware parameters in the FIG. 9 example include third party software, open source and proprietary scripts.

The application parameters in the FIG. 9 example include different types of applications from different software vendors, such as Oracle, SAP and Microsoft.

It is to be appreciated that the particular physical and logical features illustrated in respective FIGS. 8 and 9 are examples only and can be varied to include additional or alternative features in other embodiments. As noted above, various subsets of these features can be reflected in the attributes 102, workload 103, criteria 104 and process 106 associated with a given workload capsule 105.

The workload capsule generation and processing functionality described above can be applied to a wide variety of different processing jobs. For example, a given workload capsule can comprise a genomics processing workload capsule specifying a genomics processing job that represents a portion of a larger genomics processing job partitioned into multiple distinct workload capsules. As another example, a given workload capsule can comprise a payroll processing workload capsule specifying a payroll processing job for one or more employees or groups of employees of an enterprise. Numerous other types of processing jobs can be separated into workload capsules as disclosed herein.

Although shown in FIG. 1 as being separate from the source device 101 and the processing platform 112, the broker device 110 in some embodiments can be implemented at least in part on such devices or platforms. For example, as indicated previously, at least a portion of a broker device can be implemented using an application program running on the source device 101. Numerous alternative arrangements are possible.

Also, it should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 10. The process as shown includes steps 1000 through 1004, and is suitable for use in the system 100 but is more generally applicable to other types of information processing systems comprising multiple processing platforms and a broker device.

In step 1000, a plurality of workload capsules are generated on a first processing platform. In the context of the FIG. 1 embodiment, one or more workload capsules including the workload capsule 105 are generated by the processing platform that includes the source device 101, and additional workload capsules may be generated by other source devices of that processing platform.

In step 1002, the workload capsules are transmitted to a broker device over a network. The broker device is also assumed to receive one or more additional workload capsules from other processing platforms of the system. A given one of the workload capsules comprises a self-contained and independent workload to be performed by another processing platform as determined by the broker device. This other processing platform is illustratively the broker-selected processing platform 112 of system 100, although in other embodiments the user associated with the workload capsule can be involved in selection of a particular processing platform for execution of that workload capsule as previously described.

In step 1004, a completed version of the workload capsule is received by the destination device, which as indicated above may but need not be the same as the source device. The completed version comprises workload processing results from the other processing platform that performs the workload.

Figure 10:
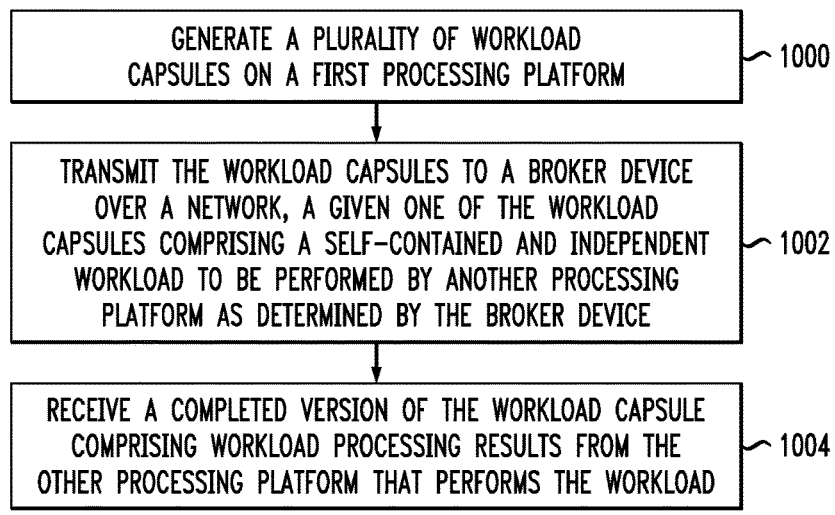
FIG. 10 is a flow diagram of operations associated with work capsule generation and broker-directed workload capsule processing in an illustrative embodiment.

The particular processing operations and other system functionality described in conjunction with the flow diagram of FIG. 10 are presented by way of illustrative example only, and should not be construed as limiting the scope of the invention in any way. Alternative embodiments can use other types of processing operations involving one or more workload capsules generated and executed on respective processing platforms of an information processing system. For example, the ordering of the process steps may be varied in other embodiments, or certain steps may be performed at least in part concurrently with one another rather than serially. Also, at least portions of the process may be repeated periodically for different workload capsules, or different instances of the process may be performed in parallel with one another for different workload capsules.

It is to be appreciated that functionality such as that described in conjunction with the flow diagram of FIG. 10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

The above-described illustrative embodiments provide significant improvements relative to conventional practice. For example, one or more such embodiments can facilitate completion of workloads of one processing platform in a particularly efficient, flexible and cost-effective manner through utilization of unused capacity on the other processing platforms. These embodiments allow a given processing platform to offload at least portions of its workloads while also substantially improving the resource utilization of other processing platforms. For example, use of the disclosed techniques in some implementations encourages utilization of spare capacity to such an extent that it can help to keep the resource utilization of the other processing platforms near 100 percent at all times.

Accordingly, illustrative embodiments provide an efficient, flexible and cost-effective approach for users of requesting processing platforms to have their workload capsules executed while also providing a significant revenue stream to the other processing platforms that execute the workload capsules.

This advantageously reduces risk to capital investments of hardware and software as idled hardware and software can be repurposed to processing of workload capsules without physical relocation or reinstallation. The hardware, software and other resources of a given receiving processing platform can simply be redirected as needed from processing local workloads to processing workload capsules.

In some embodiments, a workload capsule can be bid on as a single unit by multiple processing platforms independently of the particular source and destination devices of that workload capsule, and without any dependence on outside resources. This allows for vigorous competition in conjunction with brokering of the workload capsules to their respective executing processing platforms. Spare capacity on a wide variety of difference processing platforms can be time shared for competitive pricing across the globe.

Workload capsules can be stored at least temporarily at a processing platform associated with the broker device 110. For example, multiple source devices can upload their workload capsules to the broker device and the broker device can notify those processing platforms that might have an interest in bidding or otherwise obtaining the rights to execute the workload capsules. Some bidding embodiments are configured such that after a specified time limit is reached, the workload capsule is immediately transmitted to the processing platform associated with the lowest bidder. It is to be appreciated, however, that other embodiments do not require bidding.

Use of workload capsules in some embodiments frees the associated workload and corresponding business outcome from the infrastructure constraints and other limitations of the processing platforms on which the workload capsules are generated.

Some embodiments of the invention facilitate the performance of complex processing jobs such as big data analytics processing jobs that can be broken down into multiple self-contained workload capsules and distributed to multiple distinct processing platforms for execution. Examples of such processing jobs include the previously-mentioned large genomics processing job that is partitioned into multiple smaller genomics processing jobs each encapsulated in a different workload capsule. As a more particular example, assume that a new drug is to be tested against the human genome. The processing job could be separated into workloads that are encapsulated in workload capsules. These workload capsules are processed by multiple distinct processing platforms and then the results are reassembled at the destination device, potentially achieving a many-fold reduction in processing time. Such an arrangement can consider-ably facilitate collaboration between multiple hospitals, universities or other entities on an otherwise intractable genomics problem.

Portions of a given complex processing job configured as respective workload capsules can additionally or alternatively be distributed to various public clouds such as AWS, GCP or Azure. Other types of cloud-based systems such as VMWare® Vcloud Air or telecommunication company clouds can also be used. More generally, various combinations of public, private, hybrid and boutique clouds or other processing platform arrangements can utilized to execute the workload capsules. Accordingly, a very diverse array of resources from highly distinct processing platforms from different service providers can be leveraged to perform different portions of a complex big data analytics processing job or other complex processing job with the different portions corresponding to different workload capsules. The various processing platforms and their associated entities can bid for or otherwise obtain the rights to execute these workload capsules. Winning bidders are responsible for execution of the corresponding workload capsules and for delivery of the processing results to the destination device or back to the broker device.

The workload capsule arrangements of the illustrative embodiments can be applied to a wide variety of different processing contexts. As noted above, another example is in the context of payroll processing. In this context, the workload is known and predictable. It can be encapsulated as a separate workload capsule per employee or designated group of employees, with appropriate security resources specified, such that the payroll processing for each employee or group of employees could hypothetically be performed by a different data center or other processing platform each week. The executing processing platform could change from week to week based on different bids that are entered for the weekly workload capsules from different processing platforms depending on their available spare capacity at that time.

Examples of other processing contexts that are well suited for use of workload capsules as disclosed herein include processing of medical information in the healthcare context. Workload capsules in this context can allow a patient processing workload including any relevant medical records of that patient to be containerized into a workload capsule that can be processed by different entities such as hospitals, doctors and other medical service providers. Similar advantages are provided in numerous other contexts.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 11:
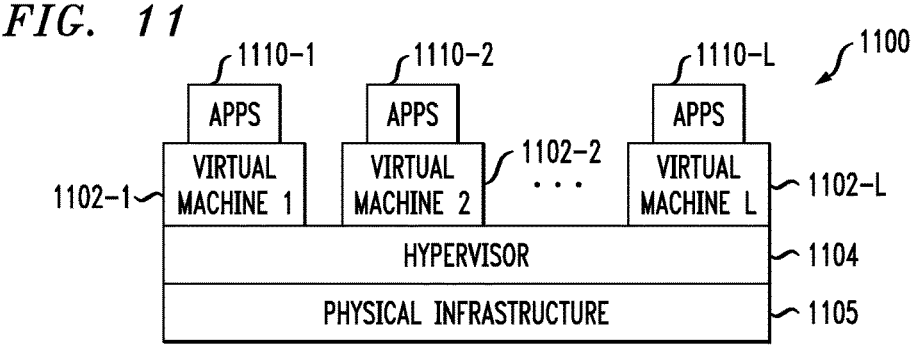
FIGS. 11 and 12 show examples of processing platforms that may be utilized to implement at least parts of an information processing system in illustrative embodiments.
Figure 12:
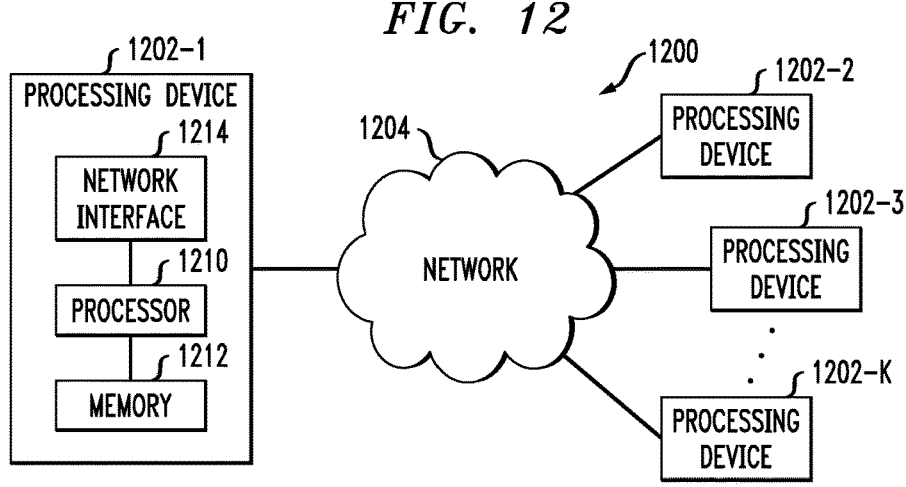

As shown in FIG. 11, portions of the information processing system 100 may comprise cloud infrastructure 1100. The cloud infrastructure 1100 comprises virtual machines (VMs) 1102-1, 1102-2, . . . 1102-L implemented using a hypervisor 1104. The hypervisor 1104 runs on physical infrastructure 1105. The cloud infrastructure 1100 further comprises sets of applications 1110-1, 1110-2, . . . 1110-L running on respective ones of the virtual machines 1102-1, 1102-2, . . . 1102-L under the control of the hypervisor 1104.

Although only a single hypervisor 1104 is shown in the embodiment of FIG. 11, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 1104 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage functionality implemented at least in part using storage arrays such as VNX® and Symmetrix VMAX® storage arrays, both commercially available from EMC Corporation of Hopkinton, Mass.

A variety of other storage products may be utilized to implement at least a portion of a processing platform of the system 100. For example, a given processing platform can comprise any of a variety of different types of storage including network-attached storage (NAS), storage area networks (SANs), direct-attached storage (DAS), distributed DAS and software-defined storage (SDS), as well as combinations of these and other storage types. Other types of storage products that can be used in implementing a given processing platform in an illustrative embodiment include SDS products such as ScaleIO™, scale-out all-flash storage arrays such as XtremIO™, as well as scale-out NAS clusters comprising Isilon® platform nodes and associated accelerators in the S-Series, X-Series and NL-Series product lines, all commercially available from EMC Corporation.

One or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, such as container-based virtualization infrastructure using Docker containers or other types of containers, in place of or in addition to virtualization infrastructure comprising virtual machines.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device such as one of the virtual machines 1102 or one of the processing devices 1202. For example, the process 106, delivery module 107 and broker device 110 in the FIG. 1 embodiment are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems and associated processing platforms in which it is desirable to provide workload capsule generation and processing functionality. Also, the particular configurations of system and device elements shown in FIGS. 1-7, 11 and 12 and the process operations shown in FIG. 10 can be varied in other embodiments. Thus, for example, the particular type of workload capsule generated in a given embodiment and its associated attributes, workload, criteria and process description may be varied. Other aspects of the illustrative embodiments such as physical or logical encapsulation features can also be varied.

Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least a first processing platform comprising one or more processing devices;
   the first processing platform being configured:
      to generate a plurality of workload capsules for transmission to a broker device over a network, the broker device comprising one or more processing devices; and
      to transmit at least a given one of the workload capsules to the broker device over at least one network;
   the given workload capsule comprising a self-contained and independent workload to be performed by at least a second processing platform as determined by the broker device in accordance with one or more attributes specified in the given workload capsule and one or more criteria specified in the given workload capsule;
   the given workload capsule further comprising a process description identifying at least one of server resources, storage resources, network resources and physical security resources to be utilized by the second processing platform in performing the self-contained and independent workload;
   wherein generating the given workload capsule is based at least in part on matching the one or more attributes, the one or more criteria and the process description to: one or more physical encapsulation features controlling an encapsulated size of the given workload capsule; and one or more logical encapsulation features controlling an encapsulated complexity of the given workload capsule;
   wherein the encapsulated size of the given workload capsule is defined by a set of size parameters for at least one of the server resources, storage resources, network resources and physical security resources to be utilized in performing the self-contained and independent workload; and
   wherein the encapsulated complexity of the given workload capsule is defined by a set of complexity parameters for at least one of service level agreement parameters, data type parameters, middleware parameters and application parameters to be utilized in performing the self-contained and independent workload.

2. The apparatus of claim 1 wherein the plurality of workload capsules are aggregated by the broker device with other workload capsules for purposes of permitting the other processing platform and one or more additional processing platforms to enter bids for performing corresponding self-contained and independent workloads.

3. The apparatus of claim 1 wherein the given workload capsule is generated for a particular source device and specifies that results are to be returned to that source device over the network.

4. The apparatus of claim 1 wherein the given workload capsule is generated for a particular source device and specifies that results are to be returned to a particular destination device different than the source device.

5. The apparatus of claim 1 wherein the plurality of workload capsules can each be bid on by the other processing platform and one or more additional processing platforms independently of source and destination devices of the workload capsules.

6. The apparatus of claim 1 wherein the given workload capsule specifies a partial processing job that represents a portion of a larger processing job partitioned into multiple distinct workload capsules.

7. The apparatus of claim 1 wherein the given workload capsule comprises data to be processed and metadata indicating at least a portion of the one or more attributes, the one or more criteria and the process description.

8. The apparatus of claim 1 wherein said at least one processing platform that generates the given workload capsule runs an application program providing a user interface that presents information characterizing multiple other processing platforms that are available to perform the self-contained and independent workload and allows a user to select one of the multiple other processing platforms to perform the self-contained and independent workload.

9. The apparatus of claim 1 wherein the broker device is part of a central compute depository platform that receives workload capsules from source devices over the network, delivers the workload capsules to other processing platforms over the network for processing of corresponding self-contained and independent workloads, and returns results of the processing of the self-contained and independent workloads to destination devices over the network.

10. The apparatus of claim 1 wherein the server resources are characterized by a plurality of server parameters including one or more of a processor speed parameter, a memory size parameter and a memory speed parameter.

11. The apparatus of claim 1 wherein the storage resources are characterized by a plurality of storage parameters including one or more of a bulk IO parameter, an IO density parameter and a recover point objective parameter.

12. The apparatus of claim 1 wherein the network resources are characterized by a plurality of network parameters including one or more of a bandwidth parameter, a prioritization parameter and an encryption parameter.

13. The apparatus of claim 1 wherein the process description further identifies one or more of data type parameters, middleware parameters, application parameters and service parameters to be utilized by the second processing platform in performing the self-contained and independent workload.

14. The apparatus of claim 1 wherein the given workload capsule comprises one of:
   a genomics processing workload capsule specifying a genomics processing job that represents a portion of a larger genomics processing job partitioned into multiple distinct workload capsules; and
   a payroll processing workload capsule specifying a payroll processing job for at least one employee of an enterprise.

15. A method comprising:
   generating a plurality of workload capsules; and
   transmitting at least a given one of the workload capsules to a broker device over a network, the broker device comprising one or more processing devices;
   wherein the generating and transmitting are implemented by at least a first processing platform comprising one or more processing devices;
   the given workload capsule comprising a self-contained and independent workload to be performed by a second processing platform as determined by the broker device in accordance with one or more attributes specified in the given workload capsule and one or more criteria specified in the given workload capsule; and the given workload capsule further comprising a process description identifying at least one of server resources, storage resources, network resources and physical security resources to be utilized by the second processing platform in performing the self-contained and independent workload;

wherein generating the given workload capsule is based at least in part on matching the one or more attributes, the one or more criteria and the process description to: one or more physical encapsulation features controlling an encapsulated size of the given workload capsule; and one or more logical encapsulation features controlling an encapsulated complexity of the given workload capsule;

wherein the encapsulated size of the given workload capsule is defined by a set of size parameters for at least one of the server resources, storage resources, network resources and physical security resources to be utilized in performing the self-contained and independent workload; and wherein the encapsulated complexity of the given workload capsule is defined by a set of complexity parameters for at least one of service level agreement parameters, data type parameters, middleware parameters and application parameters to be utilized in performing the self-contained and independent workload.

16. The method of claim 15 further comprising receiving a completed version of the given workload capsule comprising workload processing results from the second processing platform that performs the self-contained and independent workload.

17. The method of claim 15 further comprising running an application program on said at least one processing platform that generates the given workload capsule to provide a user interface that presents information characterizing multiple other processing platforms that are available to perform the self-contained and independent workload and allows a user to select one of the multiple other processing platforms to perform the self-contained and independent workload.

18. A computer program product comprising a non-transitory processor-readable storage medium having stored therein program code of one or more software programs, wherein the program code when executed by at least a first processing platform comprising at least one processing device causes the first processing platform:

to generate a plurality of workload capsules; and to transmit at least a given one of the workload capsules from the first processing platform to a broker device over a network, the broker device comprising one or more processing devices;

the given workload capsule comprising a self-contained and independent workload to be performed by a second processing platform as determined by the broker device in accordance with one or more attributes specified in the given workload capsule and one or more criteria specified in the given workload capsule; and the given workload capsule further comprising a process description identifying at least one of server resources, storage resources, network resources and physical security resources to be utilized by the second processing platform in performing the self-contained and independent workload;

wherein generating the given workload capsule is based at least in part on matching the one or more attributes, the one or more criteria and the process description to: one or more physical encapsulation features controlling an encapsulated size of the given workload capsule; and one or more logical encapsulation features controlling an encapsulated complexity of the given workload capsule;

wherein the encapsulated size of the given workload capsule is defined by a set of size parameters for at least one of the server resources, storage resources, network resources and physical security resources to be utilized in performing the self-contained and independent workload; and wherein the encapsulated complexity of the given workload capsule is defined by a set of complexity parameters for at least one of service level agreement parameters, data type parameters, middleware parameters and application parameters to be utilized in performing the self-contained and independent workload.

19. The computer program product of claim 18 wherein the program code when executed further causes the first processing platform to run an application program that is configured:

to present information characterizing multiple other processing platforms that are available to perform the self-contained and independent workload corresponding to the given workload capsule; and to allow a user to select one of the multiple other processing platforms to perform the self-contained and independent workload.

20. The apparatus of claim 1 wherein the given workload capsule comprises a stand-alone compute entity configured for transmission to any processing platform having requisite capabilities for its execution, the stand-alone compute entity being configured to be executed by a receiving processing platform as an independent unit of work that includes all data and other information necessary to its execution on the receiving processing platform.

* * * * *